(12) United States Patent  
Ichimura et al.

(10) Patent No.: US 9,304,346 B2  
(45) Date of Patent: Apr. 5, 2016

(54) DISPLAY DEVICE INCLUDING SEAL MATERIAL WITH IMPROVED ADHESION STRENGTH FOR BONDING TWO SUBSTRATES TOGETHER

(75) Inventors: Teruhiko Ichimura, Yasu (JP); Hideaki Sakai, Yasu (JP); Shigeki Kitamura, Yasu (JP); Hiroaki Ito, Yasu (JP)

(73) Assignee: Kyocera Corporation, Kyoto (JP)

( * ) Notice: Subject to any disclaimer, the term of this patent is extended or adjusted under 35 U.S.C. 154(b) by 276 days.

(21) Appl. No.: 14/112,877

(22) PCT Filed: Apr. 16, 2012

(86) PCT No.: PCT/JP2012/060239  
§ 371 (c)(1),  
(2), (4) Date: Oct. 18, 2013

(87) PCT Pub. No.: WO2012/144450  
PCT Pub. Date: Oct. 26, 2012

(65) Prior Publication Data  
US 2014/0043574 A1    Feb. 13, 2014

(30) Foreign Application Priority Data  
Apr. 22, 2011   (JP) ................................ 2011-096373

(51) Int. Cl.  
*G02F 1/1333*     (2006.01)  
*G02F 1/1339*     (2006.01)  
*G02F 1/1343*     (2006.01)

(52) U.S. Cl.  
CPC ........ *G02F 1/133345* (2013.01); *G02F 1/1339* (2013.01); *G02F 2001/134372* (2013.01); *G02F 2201/503* (2013.01); *G02F 2202/28* (2013.01)

(58) Field of Classification Search  
CPC ................ H01L 2924/00; H01L 2224/32225; H01L 2924/10253; H01L 2224/16225; H01L 2224/48465; H01L 2224/48227; H01L 2924/00014; H01L 2224/48247; H01L 2224/73265; H01L 2924/01078; H01L 27/3244  
See application file for complete search history.

(56) References Cited

U.S. PATENT DOCUMENTS 9,006,051 B2 *   4/2015   Oikawa ................. H01L 21/568  
                                                                    257/354

(Continued)

FOREIGN PATENT DOCUMENTS

CN          100424576 C     10/2008  
JP           2006178368 A      7/2006

(Continued)

OTHER PUBLICATIONS

International Search Report, PCT/JP2012/060239, May 24, 2012, 4 pp.  
Chinese Office Action with English concise explanation, Chinese Patent Application No. 201280017704.9, May 4, 2015, 7 pgs.

*Primary Examiner* — Huyen Ngo  
(74) *Attorney, Agent, or Firm* — Volpe and Koenig, P.C.

(57) ABSTRACT

A display device includes: a first substrate and a second substrate which are located so that inner main surfaces thereof face each other; a liquid crystal layer located between the first substrate and the second substrate; a seal material located between the first substrate and the second substrate so as to surround the liquid crystal layer, the seal material bonding the first substrate and the second substrate to each other; an organic insulation film located in a seal formation area on the inner main surface of the second substrate, the organic insulation film having an opening section in the seal formation area; and an inorganic insulation film located to continue from an inside of the opening section to a surface of the organic insulation film through an inner wall surface of the opening section, the inorganic insulation film being directly covered with the seal material.

6 Claims, 12 Drawing Sheets

(56) References Cited

U.S. PATENT DOCUMENTS

| | | | |
|---|---|---|---|
| 2006/0139505 A1* | 6/2006 | Yoshinaga | G02F 1/1345 349/43 |
| 2009/0135357 A1 | 5/2009 | Kanaya | |
| 2009/0242885 A1* | 10/2009 | Takamatsu | G02F 1/1345 257/59 |
| 2010/0149477 A1* | 6/2010 | Nagami | G02F 1/133514 349/138 |

FOREIGN PATENT DOCUMENTS

| | | |
|---|---|---|
| JP | 2009128893 A | 6/2009 |
| JP | 2010139953 A | 6/2010 |

\* cited by examiner

FIG. 6
(a)
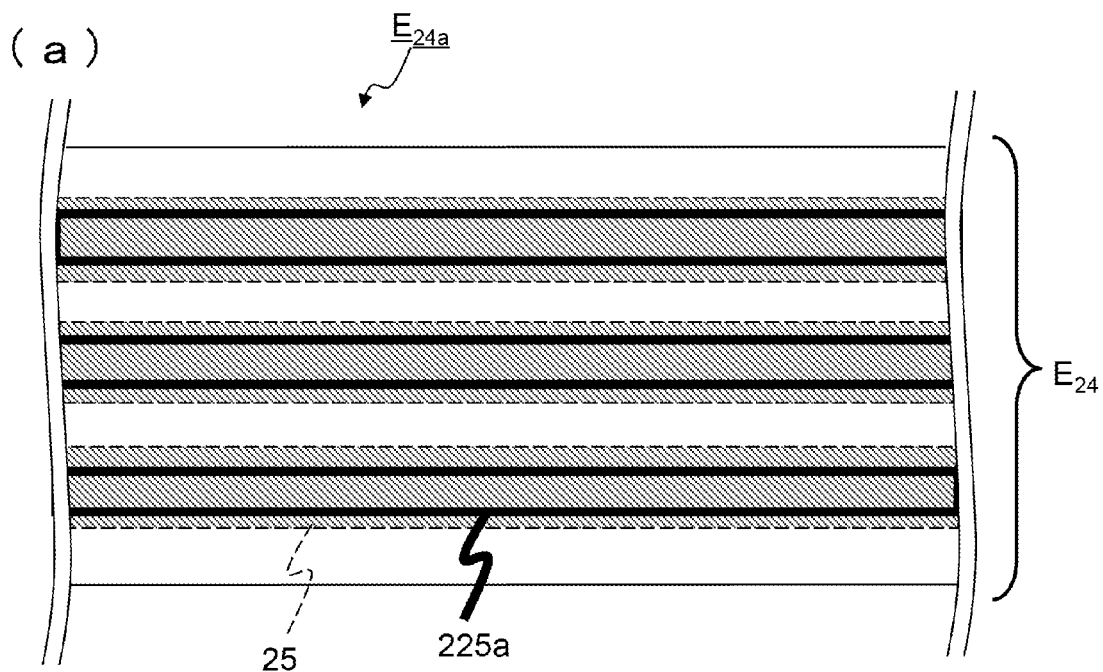
(b)
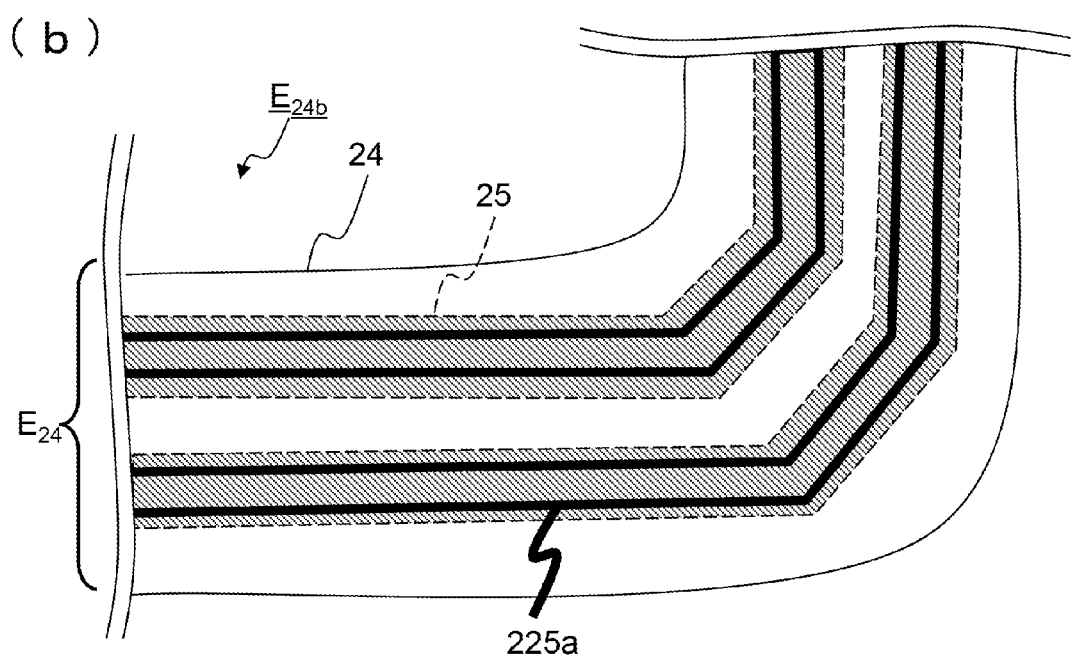

DISPLAY DEVICE INCLUDING SEAL MATERIAL WITH IMPROVED ADHESION STRENGTH FOR BONDING TWO SUBSTRATES TOGETHER

FIELD OF INVENTION

The present invention relates to a display device for use in various apparatus such as a cellular phone, a digital camera, a portable game machine or a potable information terminal.

BACKGROUND

A display device includes a first substrate and a second substrate which are located opposite to each other, a liquid crystal layer located between these substrates and a seal material bonding the first substrate and the second substrate, the seal material being formed of an organic material (for example, Japanese Unexamined Patent Publication JP-A 2009-128893).

In addition, a plurality of source wirings and a plurality of gate wirings are located above a main surface of the second substrate, the source wiring and the gate wiring crossing each other. In addition, a planarization film formed of an organic material is located so as to cover the source wirings and the gate wirings. Furthermore, a display electrode is located in an area which is surrounded by the plurality of source wirings and the plurality of gate wirings on the planarization film.

Since the planarization film is located in an area of the main surface of the second substrate overlapping the first substrate, the second substrate can be planarized in the overlapped area and a distance between the first substrate and the second substrate can be uniformized when the first substrate and the second substrate are bonded to each other.

On the other hand, since the planarization film is located in the area of the main surface of the second substrate overlapping the first substrate, when the planarization film is positioned in an area of the second substrate in which the seal material is located, and the first substrate and the second substrate are bonded to each other by the seal material, the seal material is bonded to the planarization film on the second substrate.

However, since adhesiveness between the seal material and the planarization film formed of the organic material is low, the seal material is easy to be separated from the planarization film and adhesion strength between the first substrate and the second substrate may be decreased. In addition, in recent years, since the display device tends to be a thin bezel and to be increased in the size of the display screen, and an area in which the seal material is located is reduced, separation risk of the seal material by impact of dropping and stress due to twist or the like is increased.

The invention is made in view of the problems described above and an object of the invention is to provide a display device in which decreases in adhesion strength of a seal material are suppressed.

SUMMARY

A display device of the invention includes a first substrate and a second substrate which are located so that an inner main surface of the first substrate and an inner main surface of the second substrate face each other; a liquid crystal layer located between the first substrate and the second substrate; a seal material located between the first substrate and the second substrate so as to surround the liquid crystal layer, the seal material bonding the first substrate and the second substrate; an organic insulation film located in a seal formation area in which the seal material on the inner main surface of the second substrate is positioned, the organic insulation film having an opening section in the seal formation area; and an inorganic insulation film located to continue from an inside of the opening section to a surface of the organic insulation film through an inner wall surface of the opening section, the inorganic insulation film being directly covered with the seal material.

BRIEF DESCRIPTION OF THE DRAWING(S)

FIG. 6 is a view illustrating a relationship between a wiring conductor and a first opening section of a second planarization film in a seal formation area, FIG. 6($a$) is a plan view illustrating a peripheral portion of FIG. 1 and FIG. 6($b$) is a plan view illustrating a corner portion of FIG. 1;

DETAILED DESCRIPTION OF THE PREFERRED EMBODIMENT(S)

First Embodiment

Figure 1:
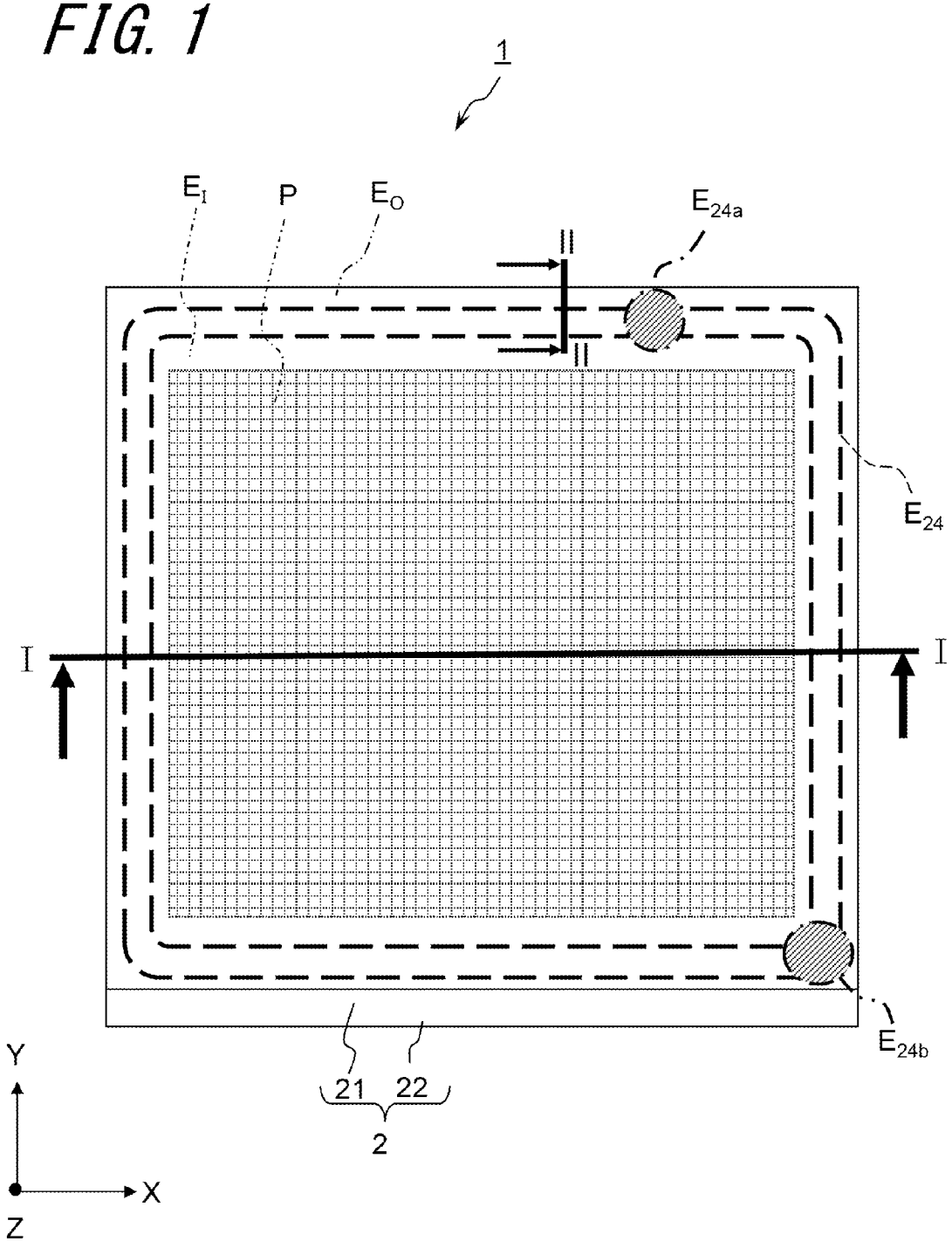
FIG. 1 is a plan view illustrating a display device according to a first embodiment of the invention.
Figure 2:
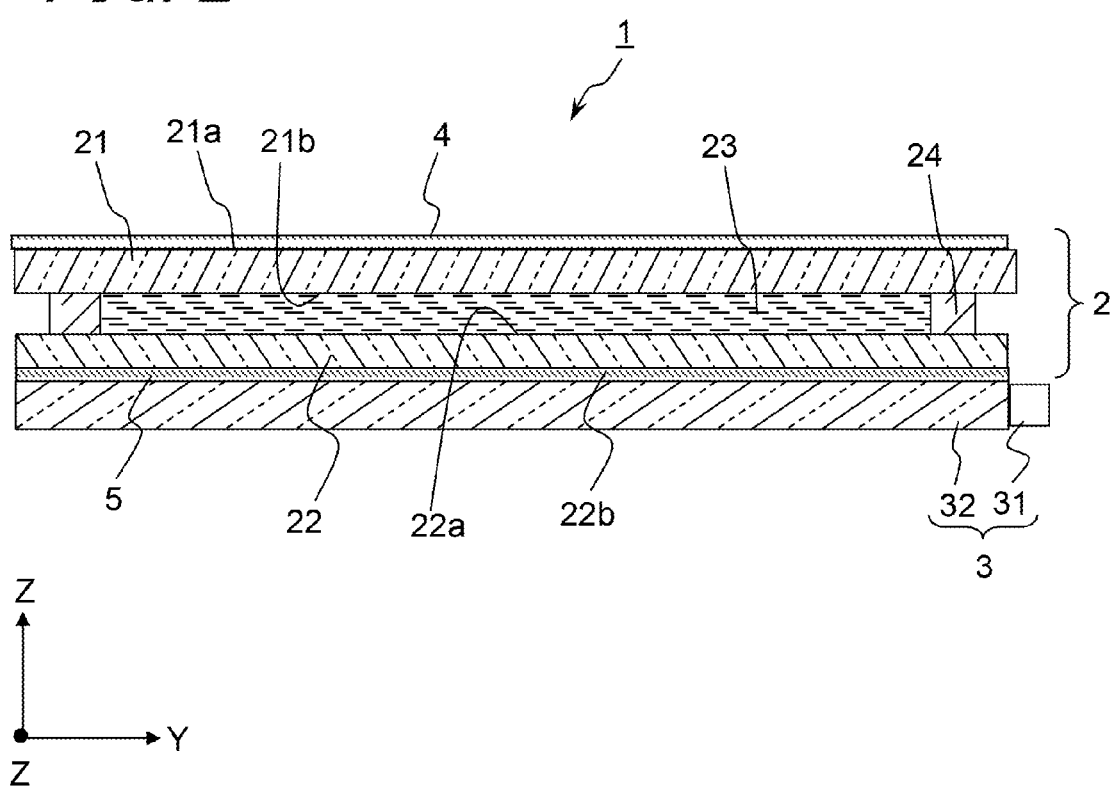
FIG. 2 is a cross-sectional view taken along the line I-I in FIG. 1.

A display device 1 according to a first embodiment of the invention is described with reference to FIGS. 1 to 7.

The display device 1 includes a liquid crystal panel 2, a light source unit 3 emitting light toward the liquid crystal panel 2, a first polarization plate 4 located on the liquid crystal panel 2, a second polarization plate 5 located between the liquid crystal panel 2 and the light source unit 3.

The liquid crystal panel 2 in the embodiment employs a so-called in-plane switching mode in which an electric field between a signal electrode located on a substrate (a second substrate 22) of one side of a pair of substrates and a common electrode is generated to control a direction of liquid crystal molecules in a liquid crystal layer. In addition, the liquid crystal panel 2 in the embodiment employs the in-plane switching mode; however, the embodiment is not limited to the mode and may employ any mode. For example, the embodiment may employ a vertical alignment mode.

The liquid crystal panel 2 is configured such that a first substrate 21 and the second substrate 22 are located opposite to each other, a liquid crystal layer 23 is located between the first substrate 21 and the second substrate 22, a seal material 24, which bonds the first substrate 21 and the second substrate 22 to each other, is located so as to surround the liquid crystal layer 23. A second main surface 21b of the first substrate 21 and a first main surface 22a of the second substrate 22 have a seal formation area $E_{24}$ in which the seal material 24 is located, an inner area $E_1$ which is surrounded by the seal material 24 and an outer area $E_O$ which is positioned on the outside of the seal material 24.

The first substrate 21 has a first main surface 21a which is used as a display surface when displaying an image and the second main surface 21b which is positioned on an opposite side to the first main surface 21a. The first substrate 21 is formed of a material having a light transmitting property, for example, such as glass and plastics.

The second main surface 21b of the first substrate 21 has a light blocking film 211, a color filter 212, a first planarization film 213 and a first orientation film 214.

The light blocking film 211 is located in a grid shape along an outer periphery of each pixel P on the second main surface 21b of the first substrate 21. Examples of a material of the light blocking film 211 include a resin in which a dye or a pigment of a color (for example, black) having high light blocking effect is added, and a metal such as chromium. In addition, the light blocking film 211 is located in the grid shape on the second main surface 21b in the embodiment; however, the light blocking film 211 is not limited to the embodiment.

The color filter 212 has a function of transmitting only a specific wavelength of visible light. A plurality of the color filters 212 are positioned on the second main surface 21b of the first substrate 21 and are located for every pixel P. Each color filter 212 has any one color of red (R), green (G) and blue (B). In addition, the color filter 212 is not limited to the above colors and may have, for example, yellow (Y), white (W) or the like. Examples of a material of the color filter 212 include a resin in which the dye or the pigment is added.

The first planarization film 213 has a function of planarizing the second main surface 21b of the first substrate 21. The first planarization film 213 is located on the light blocking film 211 and the color filter 212. The first planarization film 213 is located to continue from the inner area $E_1$ surrounded by the seal material 24 to the outer area $E_O$ through the seal formation area $E_{24}$. The first planarization film 213 is formed of an organic material, and examples of the organic material include an acrylic resin, an epoxy resin, and a polyimide resin. A thickness of the first planarization film 213 is set, for example, in a range of 1 μm to 5 μm.

The first orientation film 214 has a function of controlling orientation of the liquid crystal molecules of the liquid crystal layer 23. The first orientation film 214 is located on the first planarization film 213 in the inner area $E_1$. Examples of a material of the first orientation film 214 include the polyimide resin.

The second substrate 22 has the first main surface 22a facing the second main surface 21b of the first substrate 21, and a second main surface 22b positioned opposite to the first main surface 22a. The second substrate 22 is formed of the same material as that of the first substrate 21.

Figure 3:
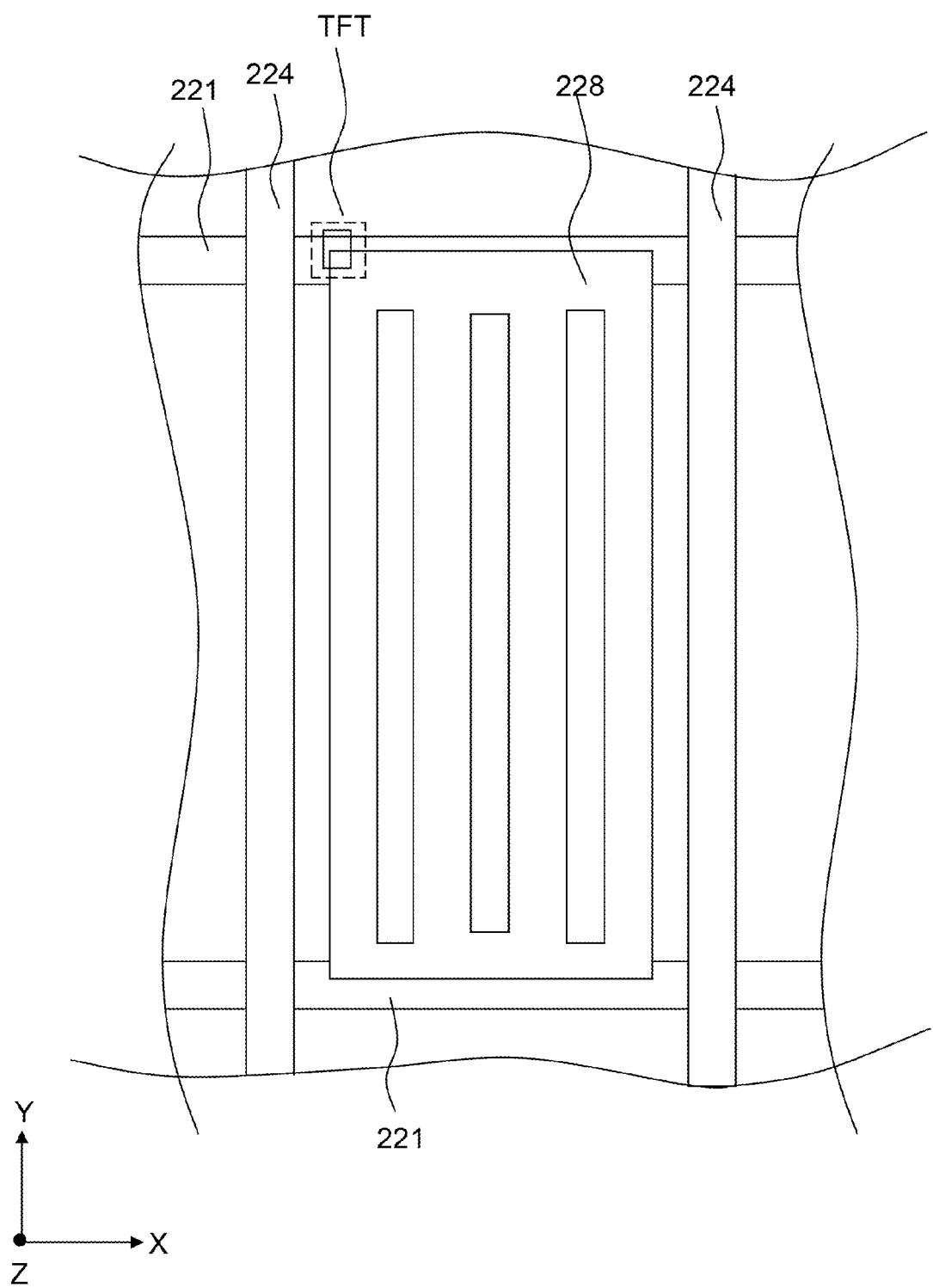
FIG. 3 is a plan view illustrating an electrode, wiring and a thin film transistor located on a second substrate in one pixel.
Figure 4:
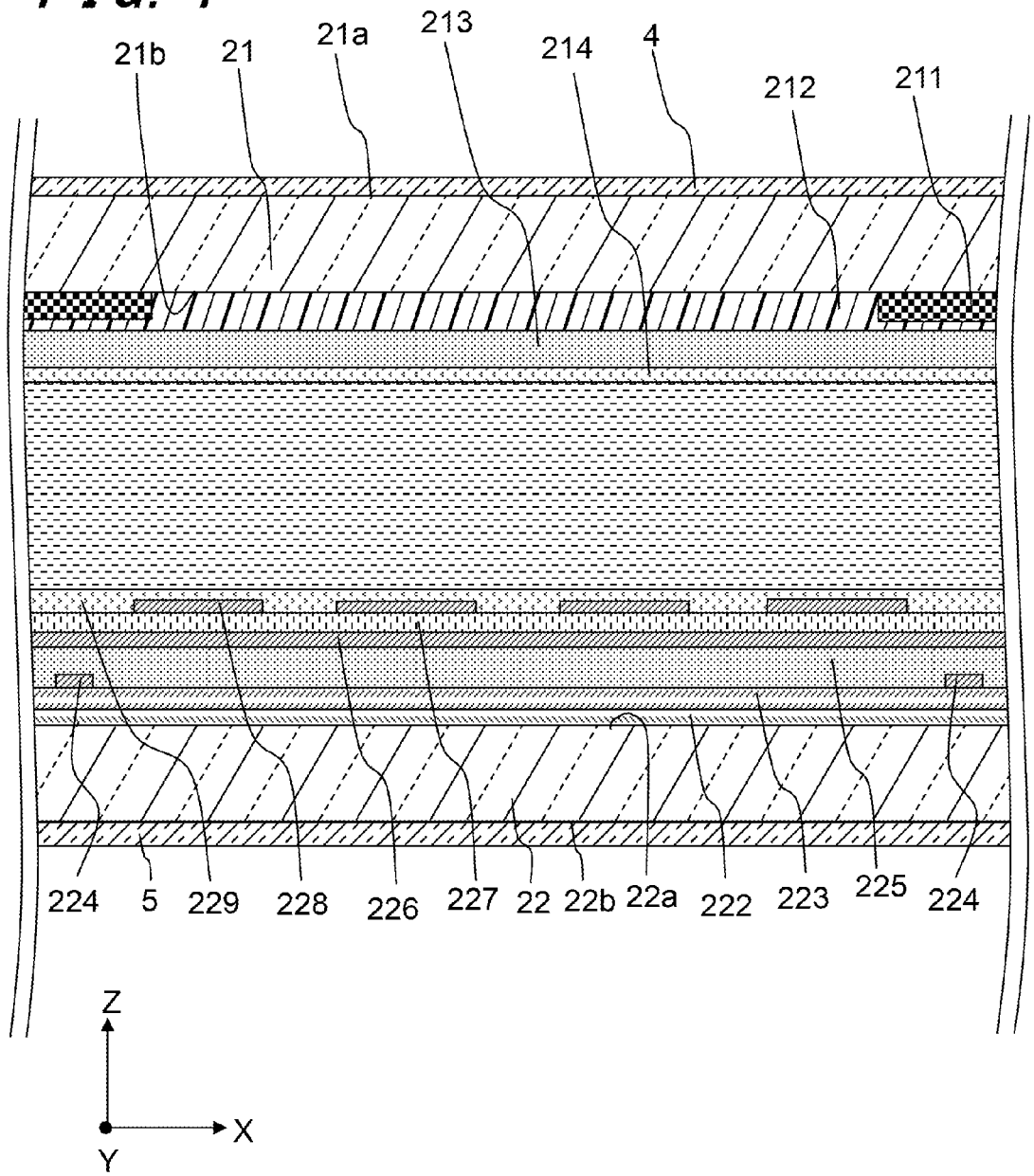
FIG. 4 is a cross-sectional view illustrating a liquid crystal panel in one pixel.

Firstly, the second substrate 22 and each member located on the second substrate 22 in the inner area $E_1$ are described with reference to FIGS. 3 and 4.

A plurality of gate wirings 221 are located on the first main surface 22a of the second substrate 22 in the inner area $E_1$, and a gate insulation film 222 is located to cover the plurality of gate wirings 221. A first interlayer insulation film 223 is located on the gate insulation film 222, and a plurality of source wirings 224 are located on the first interlayer insulation film 223. In addition, a second planarization film 225 is located on the first interlayer insulation film 223 to cover the source wirings 224, and a common electrode 226 is located on the second planarization film 225. In addition, a second interlayer insulation film 227 is located on the second planarization film 225 to cover the common electrode 226, and a signal electrode 228 is located on the second interlayer insulation film 227. Further, a second orientation film 229 is located on the second interlayer insulation film 227 to cover the signal electrode 228.

The gate wiring 221 has a function of applying a voltage supplied from a driving IC (not illustrated) to a thin film transistor TFT. As illustrated in FIG. 3, the gate wirings 221 are extended on the first main surface 22a of the second substrate 22 in an X direction. In addition, the plurality of gate wirings 221 are located side by side in a Y direction. The gate wiring 221 is formed of a conductive material, for example, aluminum, molybdenum, titanium, neodymium, chromium, copper or an alloy including them.

A forming method of the gate wiring 221 is described below.

Firstly, a metal material is formed on the first main surface 22a of the second substrate 22 as a metal film using sputtering, vapor deposition or chemical vapor deposition. A photoconductive resin is coated on a surface of the metal film, and an exposing process and a developing process are performed on the coated photoconductive resin thereby forming a pattern having a desired shape on the photoconductive resin. Next, the metal film is etched with chemical solution and the metal film is made to be a desired shape. Then, the coated photoconductive resin is separated. As described above, the gate wiring 221 is formed by depositing and patterning the metal material.

The gate insulation film 222 is located on the first main surface 22a to cover the gate wiring 221. The gate insulation film 222 is formed of a material having an insulation property such as silicon nitride or silicon oxide. In addition, the gate insulation film 222 is located on the first main surface 22a of the second substrate 22 using sputtering, vapor deposition or chemical vapor deposition described above.

The first interlayer insulation film 223 has a function of electrically insulating between the gate wiring 221 and the source wiring 224. In addition, the first interlayer insulation film 223 is located to continue from the inner area $E_1$ to the outer area $E_O$ through the seal formation area $E_{24}$. The first interlayer insulation film 223 is formed of a material having the insulation property, and examples of the material include an inorganic material such as silicon nitride or silicon oxide. In addition, in the display device 1, the first interlayer insulation film 223 is formed of silicon nitride. In addition, the first interlayer insulation film 223 is formed using the same forming method as that of the gate insulation film 222.

The source wiring 224 has a function of applying the signal voltage supplied from a driver IC to the signal electrode 228 through the thin film transistor TFT. As illustrated in FIG. 3, the plurality of source wirings 224 are extended in the Y direction. In addition, the plurality of source wirings 224 are located side by side on the first interlayer insulation film 223 in the X direction. The source wiring 224 may be formed of the same material as that of the gate wiring 221. The source wiring 224 can be formed using the same forming method as that of the gate wiring 221.

The thin film transistor TFT has a semiconductor layer such as amorphous silicon or polysilicon, a source electrode which is located on the semiconductor layer and is connected to the source wiring 224, and a drain electrode which is located on the semiconductor layer and connected to the signal electrode 228. In the thin film transistor TFT, a resistance of the semiconductor layer between the source electrode and the drain electrode is changed according to the voltage applied to the semiconductor layer through the gate wiring 221, and thereby writing or non-writing of the image signal to the signal electrode 228 is controlled.

The second planarization film 225 has a function of providing electrical insulation between the source wiring 224 and the common electrode 226 and planarizing the first main surface 22a of the second substrate 22. The second planarization film 225 is located to continue from the inner area $E_1$ to the seal formation area $E_{24}$. The second planarization film 225 is formed of an organic material, for example, a resin such as the acrylic resin, the epoxy resin or the polyimide resin. In addition, the thickness of the second planarization film 225 is set, for example, in a range of 1 μm to 5 μm.

In addition, in the display device 1, the thickness of the second planarization film 225 is set to be larger than the thickness of the first planarization film 213. Since the thin film transistor TFT, the plurality of electrodes and the plurality of wirings and the like are located on the second main surface 22a of the second substrate 22, the flatness thereof is easy to be reduced. Thus, the flatness of the second main surface 22a of the second substrate 22 can be improved by making the thickness of the second planarization film 225 to be larger than the thickness of the first planarization film 213.

The common electrode 226 has a function of generating the electric field between the signal electrodes 228 and the common electrode 226 by the voltage applied from the driver IC. The common electrode 226 is located on the second planarization film 225.

The common electrode 226 is formed of a material having the transmittance and the conductivity, for example, such as ITO (Indium Tin Oxide), IZO (Indium Zinc Oxide), ATO (Antimony Tin Oxide), AZO (Al-Doped Zinc Oxide), tin oxide, zinc oxide or electroconductive polymer.

The second interlayer insulation film 227 has a function of providing electrical insulation between the signal electrode 228 and the common electrode 226. The second interlayer insulation film 227 may be formed of the same material as that of the first interlayer insulation film 223. In addition, in the display device 1, the second interlayer insulation film 227 is formed of silicon oxide.

The signal electrode 228 has a function of generating the electric field between the common electrode 226 and the signal electrode 228 by the voltage applied from the driver IC. A plurality of signal electrodes 228 are located on the second interlayer insulation film 227 and are positioned for every pixel P. The signal electrode 228 may be formed of the same material as that of the common electrode 226.

In addition, in the embodiment, the common electrode 226, the second interlayer insulation film 227 and the signal electrode 228 are located in this order; however, the invention is not limited to the embodiment. In other words, the signal electrode 228, the second interlayer insulation film 227 and the common electrode 226 may be located in this order by placing the common electrode 226 through the second interlayer insulation film 227 on the signal electrode 228.

The second orientation film 229 has a function of controlling the orientation of the liquid crystal molecules of the liquid crystal layer 23. The second orientation film 229 is located on the second interlayer insulation film 227 to cover the signal electrode 228.

Figure 7:
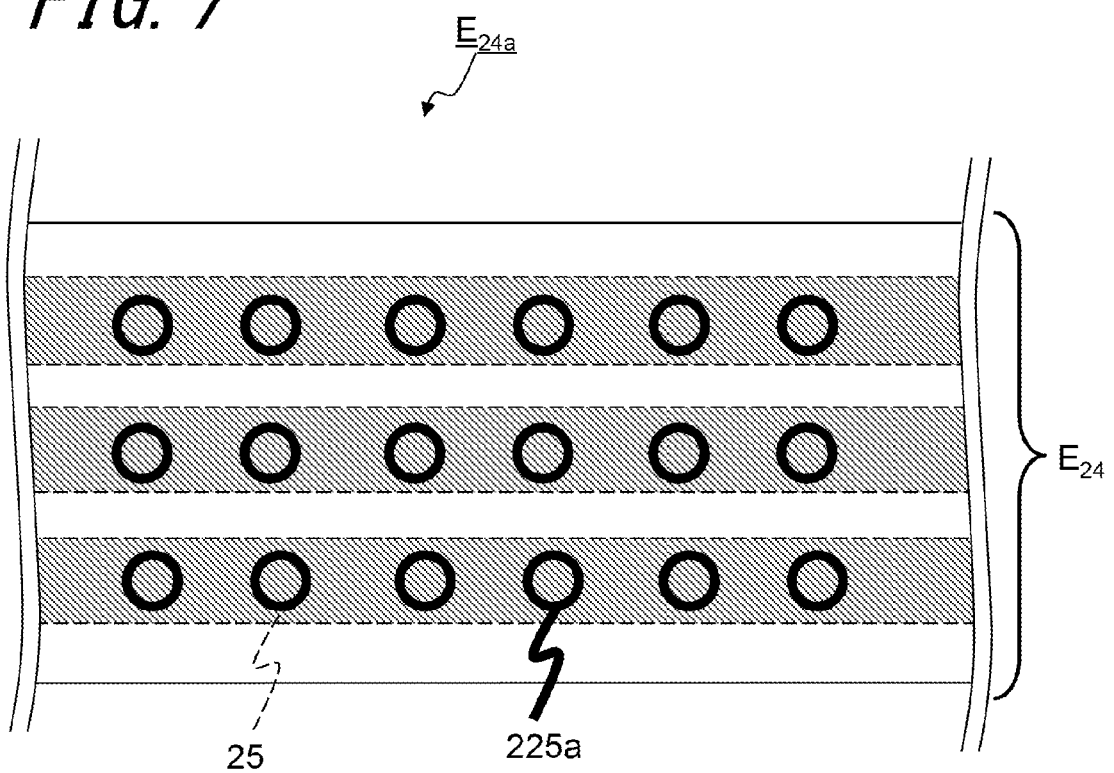
FIG. 7 is a plan view illustrating a modified example of the first opening section of the second planarization film in the seal formation area.

Next, the second substrate 22 and each member located on the second substrate 22 at the seal formation area $E_{24}$ are described with reference to FIGS. 5, 6 and 7.

The first interlayer insulation film 223 is positioned on the first main surface 22a of the second substrate 22 in the seal formation area $E_{24}$. A wiring conductor 25 is positioned on the first interlayer insulation film 223. The second planarization film 225 having a first opening section 225a is positioned on the first interlayer insulation film 223. In addition, a first inorganic insulation film 26 is positioned in the first opening section 225a of the second planarization film 225.

The wiring conductor 25 is located on the first interlayer insulation film 223. The wiring conductor 25 is located so as to overlap the seal formation area $E_{24}$ by passing through the seal formation area $E_{24}$. The wiring conductor 25 is, for example, connected to the gate wiring 221, the source wiring 224 or the like. In addition, the wiring conductor 25 may be a so-called dummy wiring conductor which is not connected to the wiring or the electrode. The material of the wiring conductor 25 is formed of a conductive material, for example, such as aluminum, molybdenum, titanium, neodymium, chromium, copper or an alloy including them. In addition, the wiring conductor 25 is formed using the same method as the gate wiring 221.

The second planarization film 225 is extended from the inner area $E_1$ to the seal formation area $E_{24}$. In addition, as illustrated in FIG. 5, an outer end of the second planarization film 225 is positioned inside more than an outer end of the seal material 24. Therefore, the first interlayer insulation film 223 is exposed from the second planarization film 225, and is adhered to the seal material 24 between the outer end of the second planarization film 225 and the outer end of the seal material 24. Accordingly, an adhesion area between the seal material 24 and the first interlayer insulation film 223 can be increased. Thus, the seal material 24 is difficult to be separated from the second substrate 22.

In addition, in display device 1, the first interlayer insulation film 223 is exposed from the second planarization film 225 between the outer end of the second planarization film 225 and the outer end of the seal material 24 in the entire seal formation area $E_{24}$. Accordingly, the seal material 24 is difficult to be separated from the second substrate 22 in the entire seal formation area $E_{24}$.

In addition, the second planarization film 225 positioned in the seal formation area $E_{24}$ has the first opening section 225a on the wiring conductor 25. In other words, the wiring conductor 25 is exposed from the second planarization film 225 in the opening section 225a.

FIG. 6(a) is a plan view illustrating a relationship between the wiring conductor 25 and the first opening section 225a of the second planarization film 225 in a peripheral portion $E_{24a}$ of the seal material 24 which is located in an annular shape of FIG. 1. In addition, FIG. 6(b) is a plan view illustrating a relationship between the wiring conductor 25 and the first opening section 225a of the second planarization film 225 in a corner portion $E_{24b}$ of FIG. 1. In addition, the outer periphery of the first opening section 225a is illustrated in a thick line in FIG. 6.

As illustrated in FIG. 6(a) and FIG. 6(b), the first opening section 225a is located to continue along the formation area of the wiring conductor 25. In addition, the first opening section 225a is located along the seal material 24. In addition, the shape of the first opening section 225a is not limited to the above shape. For example, as illustrated in FIG. 7, the shape of the first opening section 225a may be a hole shape which is scattered on the wiring conductor 25. In addition, the shape of the first opening section 225a is not limited to the circular shape and may be a polygonal shape. In addition, the width of the first opening section 225a is set, for example, in a range of 10 μm to 200 μm.

The first inorganic insulation film 26 is positioned on the wiring conductor 25 in the first opening section 225a of the second planarization film 225. In addition, as illustrated in FIG. 5, the first inorganic insulation film 26 is located to continue from the upper side of the wiring conductor 25 to the surface of the second planarization film 225 through an inner wall surface of the first opening section 225a. In other words, the first inorganic insulation film 26 is located over the wiring conductor 25, the inner wall surface of the first opening section 225a and the surface of the second planarization film 225.

Figure 5:
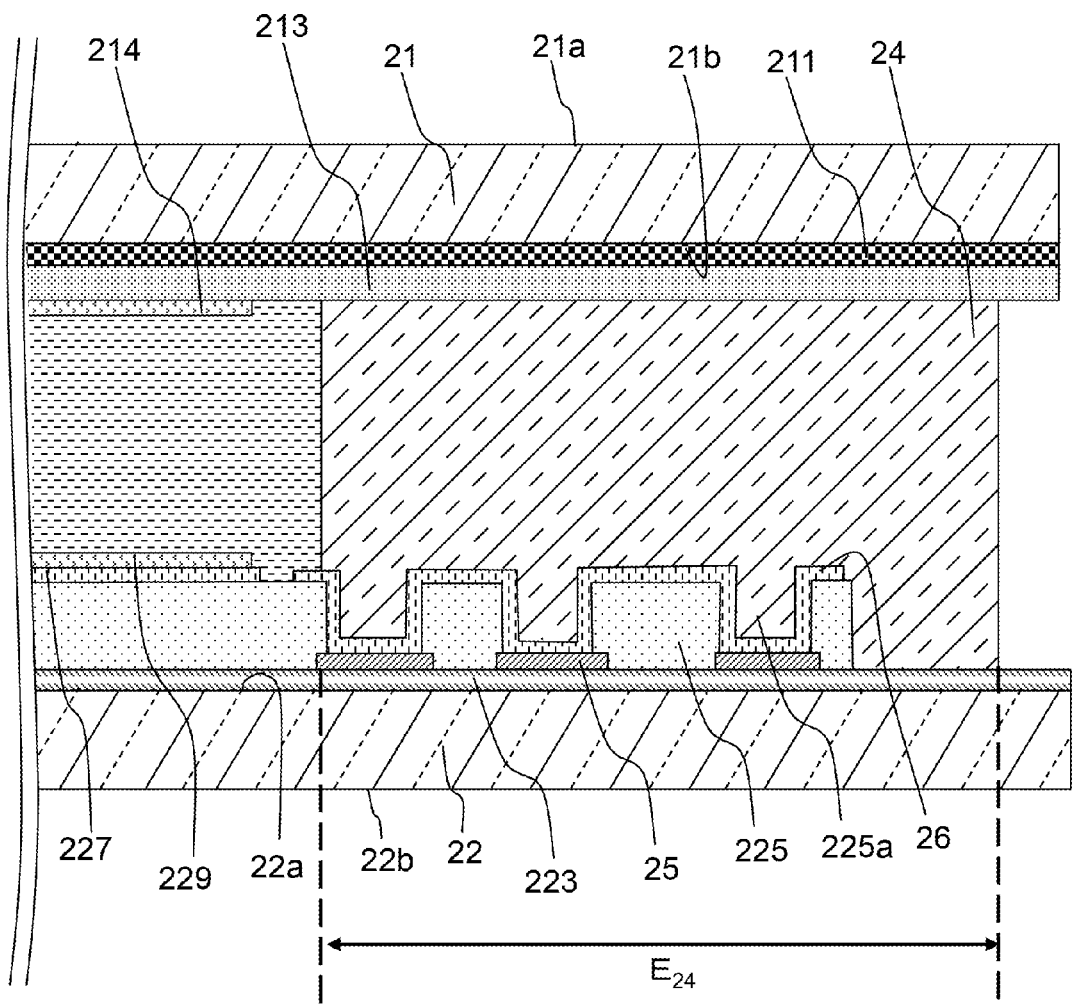
FIG. 5 is a cross-sectional view taken along the line II-II in FIG. 1.

In addition, as illustrated in FIG. 5, the first inorganic insulation film 26 is located to continue even between the first opening sections 225a adjacent to each other. Therefore, the adhesion area between the seal material 24 and the first inorganic insulation film 26 can be increased and the seal material 24 is difficult to be separated.

Herein, the adhesiveness between the wiring conductor 25 and the second planarization film 225 formed of the organic material is reduced, the second planarization film 225 is separated from the wiring conductor 25, and the second planarization film 225 may be separated from the second substrate 22 as the separation being a starting point. On the other hand, in the display device 1, the first opening section 225a of the second planarization film 225 is located on the wiring conductor 25, and the first inorganic insulation film 26 is dispoised on the wiring conductor 25. Therefore, the adhesion area between the second planarization film 225 and the wiring conductor 25 is reduced, the adhesion area between the first inorganic insulation film 26 and the wiring conductor 25 is increased and occurrence of the separation of the second planarization film 225 can be suppressed.

The first inorganic insulation film 26 is formed of an inorganic material, for example, such as silicon nitride or silicon oxide. In addition, when a main component of the first inorganic insulation film 26 is formed of the same material as that of the second interlayer insulation film 227, the second interlayer insulation film 227 and the first inorganic insulation film 26 can be formed in the same depositing process. Accordingly, the manufacturing process of the display device 1 can be simplified. Herein, the main components being the same as each other means that materials which constitutes 80% or more of the respective members are identical with each other.

The liquid crystal layer 23 is located between the first substrate 21 and the second substrate 22. The liquid crystal layer 23 includes the liquid crystal molecules such as a nematic liquid crystal, a cholesteric liquid crystal or a smectic liquid crystal.

The seal material 24 has a function of providing bonding between the first substrate 21 and the second substrate 22. The seal material 24 is located in an annular shape between the first substrate 21 and the second substrate 22. The seal material 24 is formed of the organic material such as epoxy resin.

In the display device 1, the first inorganic insulation film 26 is located to continue from the upper side of the wiring conductor 25 in the first opening section 225a of the second planarization film 225 to the surface of the second planarization film 225 through the inner wall surface of the first opening section 225a. The first inorganic insulation film 26 is directly covered with the seal material 24.

The adhesion area between the seal material 24 and the second planarization film 225 is reduced by disposing the first opening section 225a in the second planarization film 225. The adhesion area between the seal material 24 and the first inorganic insulation film 26 can be largely secured by disposing the first inorganic insulation film 26 in the first opening section 225a and by extending the first inorganic insulation film 26 to the surface of the second planarization film 225. Accordingly, the seal material 24 is difficult to be separated from the second substrate 22, and the adhesion strength between the second substrate 22 and the seal material 24 is improved.

In addition, since the corner portion $E_{24b}$ of the seal formation area $E_{24}$ is an area in which the seal material 24 is bent and is an area in which stress is easy to be concentrated by being pressed with a finger or the like, the seal material 24 tends to be separated in the corner portion $E_{24b}$. Herein, the corner portion $E_{24b}$ means a portion which extends from a start of bending of a straight portion to an end of bending thereof in the seal formation area $E_{24}$.

On the other hand, in the display device 1, the first opening section 225a and the first inorganic insulation film 26 in the first opening section 225a are positioned at the corner portion $E_{24b}$. Therefore, the separation of the seal material 24 can be suppressed in the corner portion $E_{24b}$ of the seal formation area $E_{24}$ in which the stress is easy to be concentrated. In addition, it is preferable that the first opening section 225a is located and the first inorganic insulation film 26 in the first opening section 225a is located in four corner portions of the seal formation area $E_{24}$.

The light source unit 3 has a function of emitting the light toward the liquid crystal panel 2. The light source unit 3 has a light source 31 and a light guide plate 32. In addition, the light source unit 3 in the embodiment employs a point light source such as LED as the light source 31. However, line light source such as cold-cathode pope may be employed as the light source 31.

The first polarization plate 4 has a function of selectively transmitting the light of a predetermined oscillation direction. The first polarization plate 4 is located so as to be opposite to the first main surface 21a of the first substrate 21 of the liquid crystal panel 2.

The second polarization plate 5 has a function of selectively transmitting the light of a predetermined oscillation direction. The second polarization plate 5 is located so as to opposite to the second main surface 22b of the second substrate 22.

Second Embodiment

Figure 8:
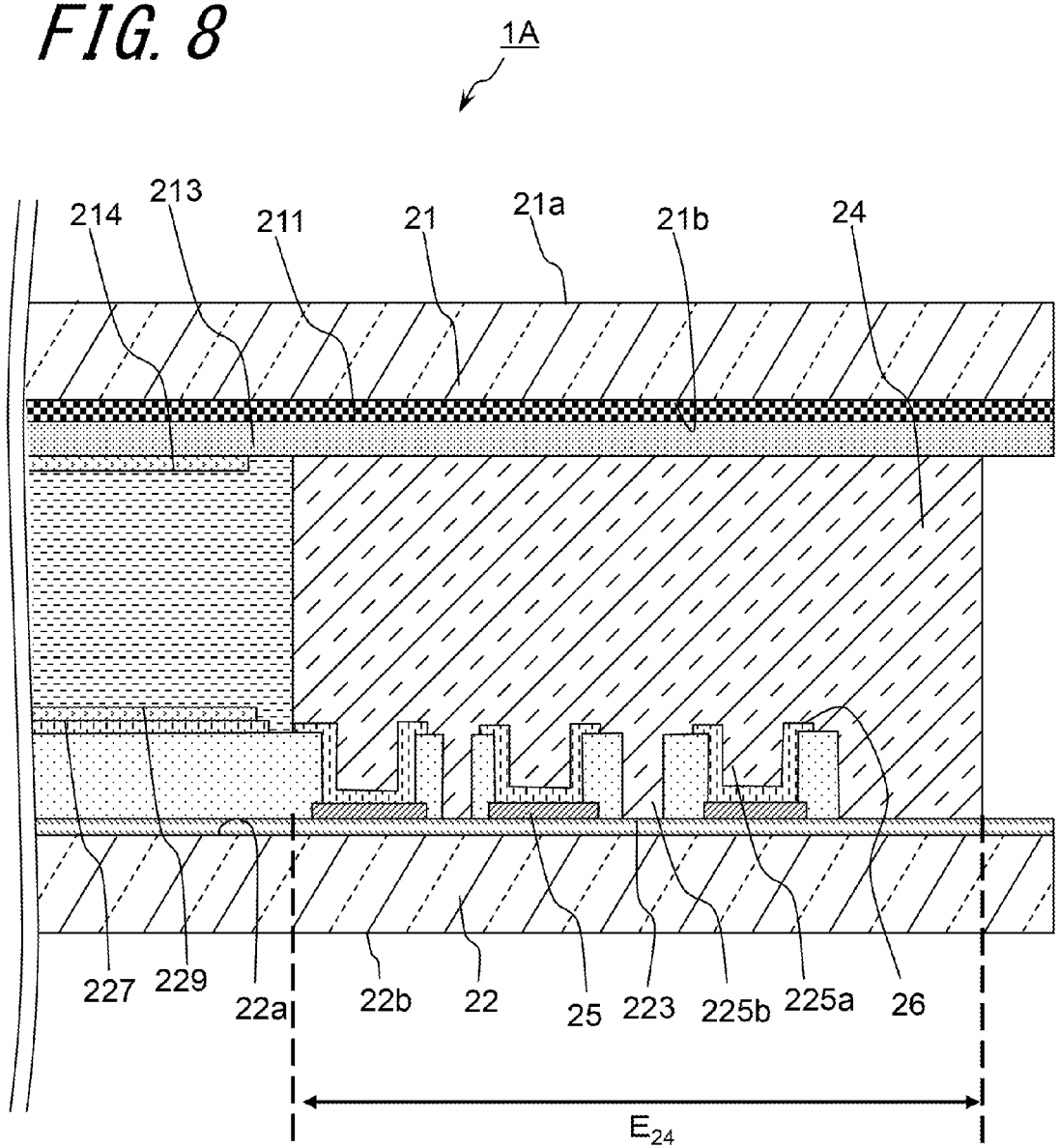
FIG. 8 is a cross-sectional view illustrating a main portion of a liquid crystal panel according to a second embodiment of the invention.
Figure 9:
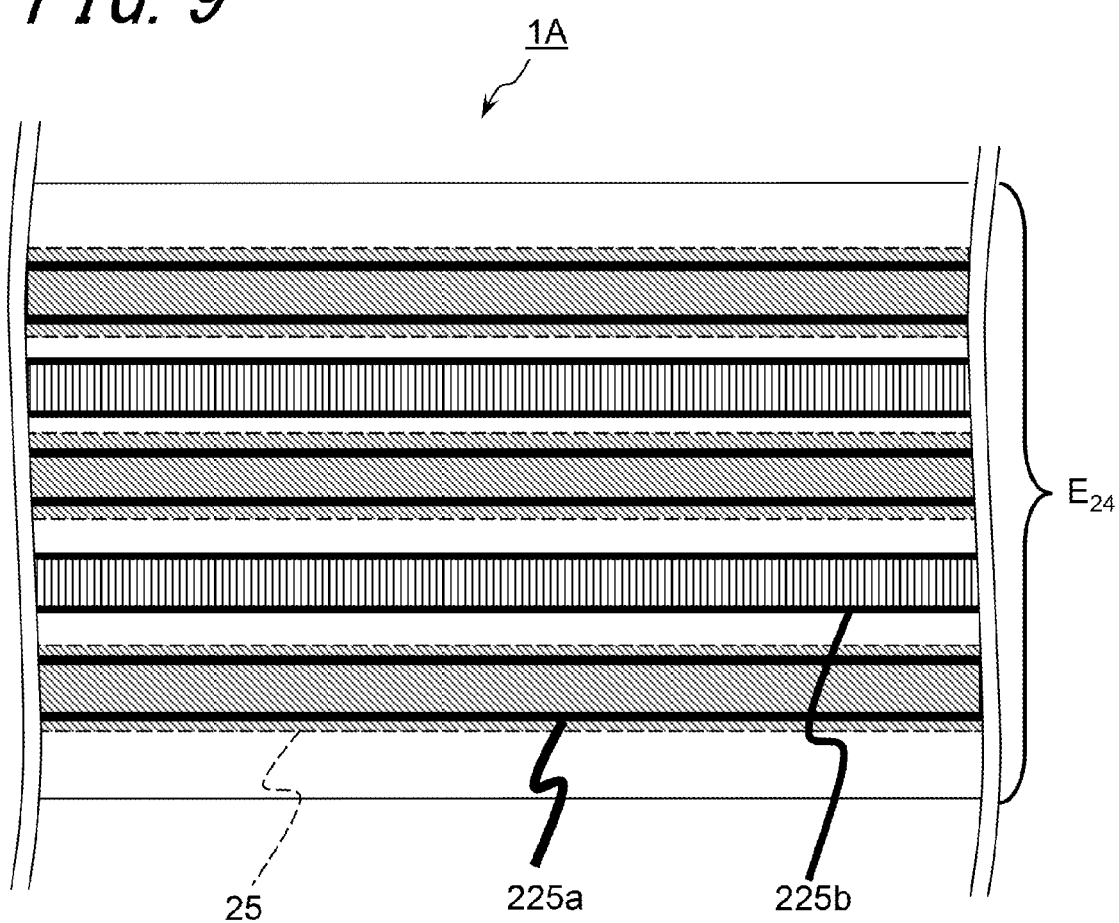
FIG. 9 is a plan view illustrating a relationship between the wiring conductor, the first opening section and a second opening section of the second planarization film in the seal formation area in the display device of FIG. 8.

FIGS. 8 and 9 are views illustrating a main portion of a display device 1A according to a second embodiment.

The display device 1A is different from the display device 1 in that the second planarization film 225 has a second opening section 225b in a wiring conductor non-forming area in which the wiring conductor 25 is not located.

As illustrated in FIGS. 8 and 9, the second opening section 225b is located in the wiring conductor non-forming area. In the display device 1A, the second opening section 225b is located between first opening sections 225a adjacent to each other and is located to continue along wiring conductors 25 adjacent to each other.

In addition, the second opening section 225b is positioned between wiring conductors 25 adjacent to each other in a plan view. Furthermore, the width of the second opening section 225*b* is set, for example, in a range of 10 μm to 100 μm. In addition, in FIG. 9, an outer periphery of the first opening section 225*a* is illustrated in a thick line. In addition, in FIG. 9, the second opening section 225*b* is an area in which an outer periphery of the second opening section 225*b* is illustrated in a thick line and the inside of the outer periphery is illustrated in vertical lines. In addition, the shape of the second opening section 225*b* is not limited to the embodiment and may be a discontinuous hole shape similar to the first opening section 225*a*. In addition, the second opening section 225*b* in the embodiment is located between wiring conductors 25 adjacent to each other; however, the formation position of the second opening section 225*b* is not limited to the embodiment. The width of the second opening section 225*b* is set to be smaller than the width of the first opening section 225*a*. Since the second opening section 225*b* is small, the adjacent wiring conductor 25 can be located in a closer state. Therefore, the formation area of a plurality of the wiring conductors 25 can be reduced and the thin bezel of the liquid crystal panel 2 is achieved.

In addition, the first interlayer insulation film 223 is positioned in the second opening section 225*b*. The first interlayer insulation film 223 positioned in the second opening section 225*b* is exposed from the second planarization film 225. In addition, the first interlayer insulation film 223 in the second opening section 225*b* is adhered to the seal material 24.

In the display device 1A, the seal material 24 is in contact with the first interlayer insulation film 223 which is formed of the inorganic material located on a bottom of the second opening section 225*b*. The adhesion area between the seal material 24 and the inorganic material can be increased by disposing the second opening section 225*b* and by making the seal material 24 be in contact with the first interlayer insulation film 223 in the second opening section 225*b*. Accordingly, the seal material 24 is difficult to be separated from the second substrate 22 and decrease in the adhesion strength of the seal material 24 can be suppressed.

In addition, in display device 1A, since the first interlayer insulation film 223 serves as a second inorganic insulation film, the first interlayer insulation film 223 and the second inorganic insulation film can be formed using the same depositing process and a manufacturing process of the display device 1A can be simplified.

In addition, the second inorganic insulation film and the first interlayer insulation film 223 may be formed of different materials as separate members.

Third Embodiment

Figure 10:
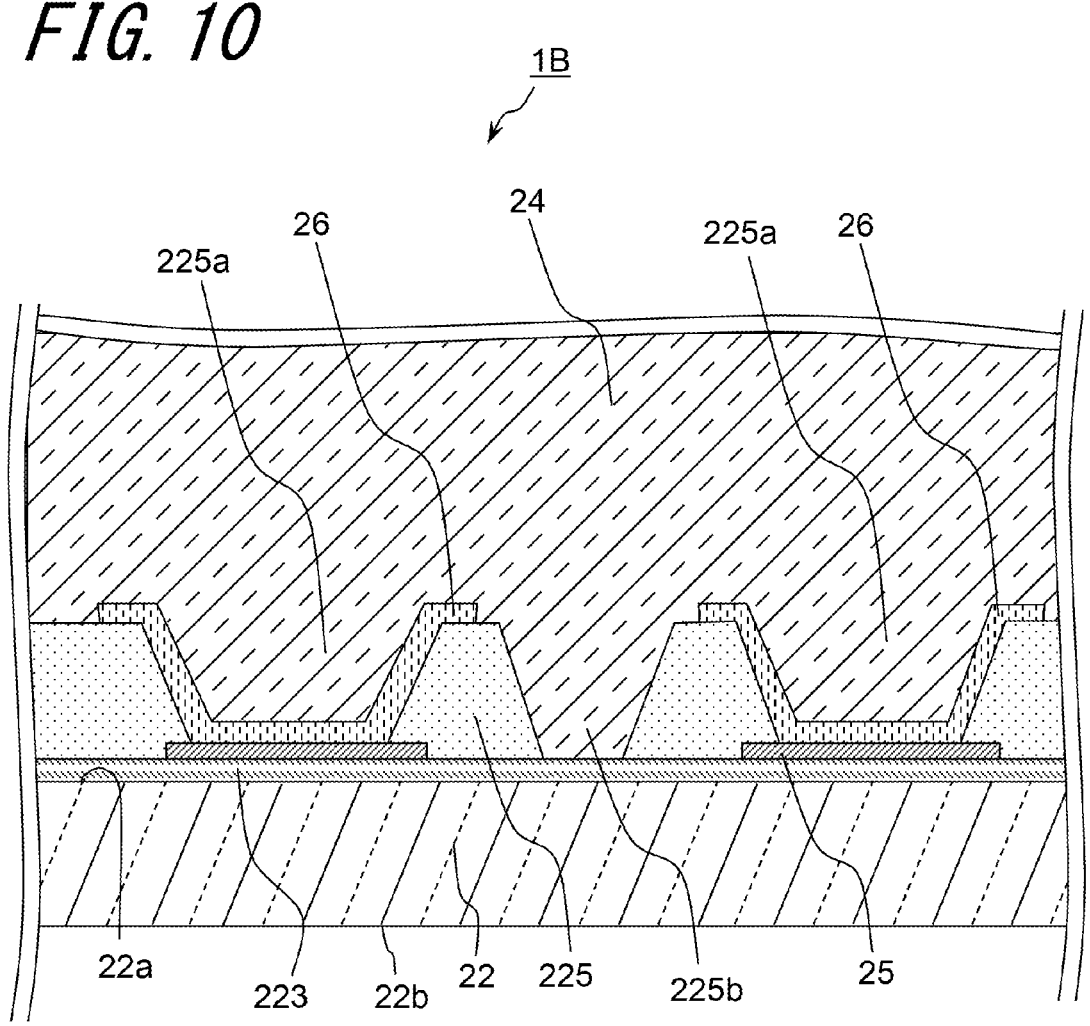
FIG. 10 is a cross-sectional view illustrating a main portion of a liquid crystal panel according to a third embodiment of the invention.

FIG. 10 is a view illustrating a display device 1B according to a third embodiment.

The display device 1B is different from the display device 1A in that the first opening section 225*a* is a tapered shape of which a width is decreased while approaching the second main surface 22*a* of the second substrate 22 when seen in a cross-sectional view.

As the display device 1, if the inner wall surface of the first opening section 225*a* is located at a substantially right angle to the first main surface 22*a* of the second substrate 22, the first inorganic insulation film 26 having a sufficient thickness may not be located in the inner wall surface when the inorganic material is deposited in the first opening section 225*a*.

On the other hand, in the display device 1B, since the first opening section 225*a* is the tapered shape, the inner wall surface of the first opening section 225*a* is inclined against the first main surface 22*a* of the second substrate 22. Accordingly, the thickness of the first inorganic insulation film 26 positioned on the inner wall surface of the first opening section 225*a* is easy to be thickened, the adhesion area between the second substrate 22 and the seal material 24 is easy to be secured, and the seal material 24 is difficult to be separated from the second substrate 22.

Fourth Embodiment

Figure 11:
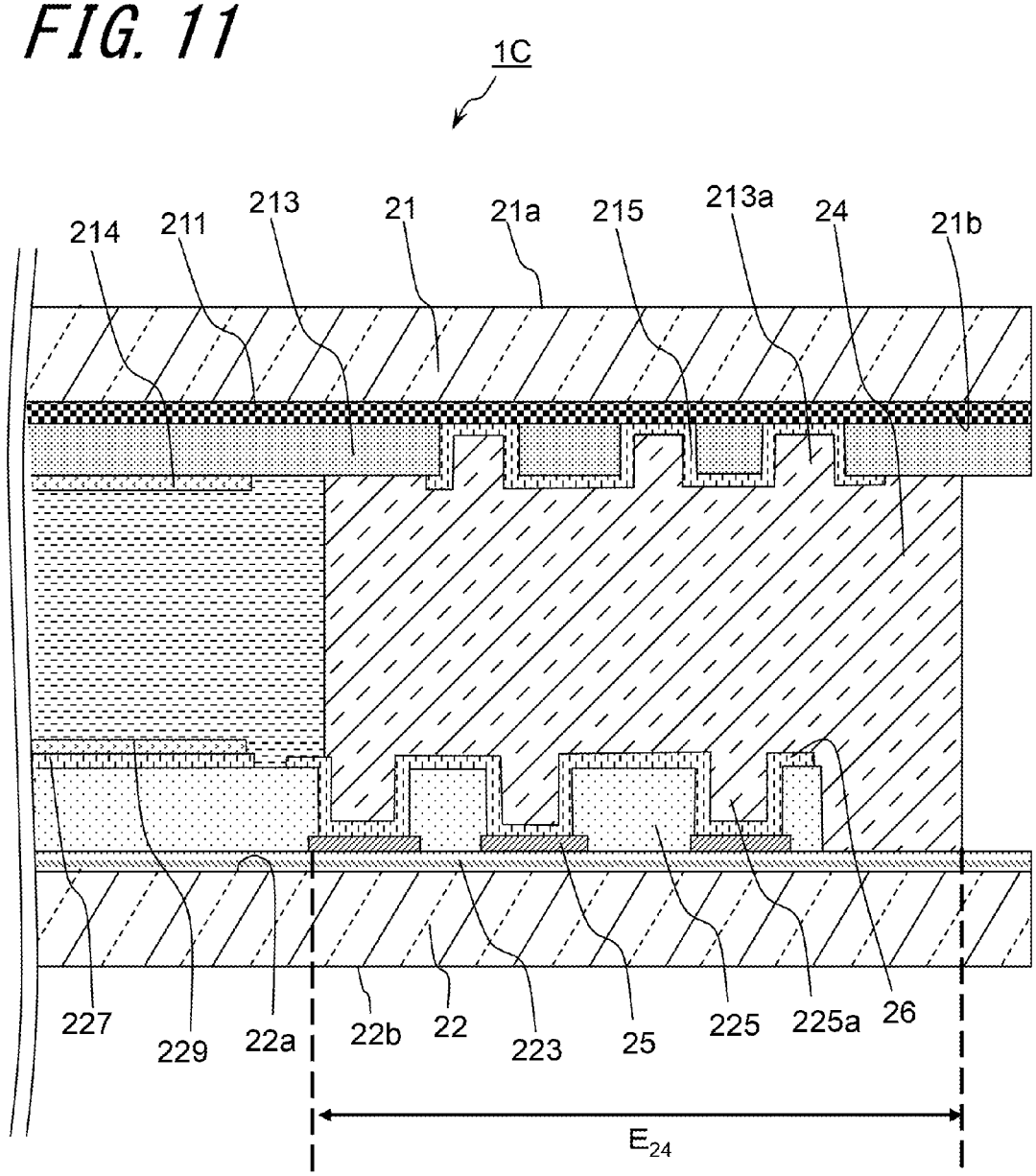
FIG. 11 is a cross-sectional view illustrating a main portion of a liquid crystal panel according to a fourth embodiment of the invention.

FIG. 11 is a view illustrating a display device 1C according to a fourth embodiment.

The display device 1C is different from the display device 1 in the following points. In the display device 1C, the first planarization film 213 has a third opening section 213*a* in the seal formation area $E_{24}$, and a third inorganic insulation film 215 is located in the third opening section 213*a*.

The third opening section 213*a* of the first planarization film 213 is located to continue along the seal material 24. In addition, the shape of the third opening section 213*a* is not limited to the embodiment and may be the hole shape which is scattered. In addition, as the third embodiment, the third opening section 213*a* may be located in the tapered shape.

The third inorganic insulation film 215 is located to continue from the third opening section 213*a* of the first planarization film 213 to the surface of the first planarization film 213 through the inner wall surface of the third opening section 213*a*. In other words, the third inorganic insulation film 215 is located from upper side of the light blocking film 211 to the inner wall surface of the third opening section 213*a* and the surface of the first planarization film 213. In addition, the third inorganic insulation film 215 is directly covered with the seal material 24.

In the display device 1C, the third inorganic insulation film 215 is located to continue from the upper side of the light blocking film 211 in the third opening section 213*a* of the first planarization film 213 to the surface of the first planarization film 213 through the inner wall surface of the third opening section 213*a*, and the third inorganic insulation film 215 is directly covered with the seal material 24.

The adhesion area between the seal material 24 and the first planarization film 213 is decreased by disposing the third opening section 213*a* in the first planarization film 213. The adhesion area between the seal material 24 and the third inorganic insulation film 215 can be largely secured by disposing the third inorganic insulation film 215 in the third opening section 213*a* and by extending the third inorganic insulation film 215 to the surface of the first planarization film 213. Accordingly, the seal material 24 is difficult to be separated from the first substrate 21, and the adhesion strength between the first substrate 21 and the seal material 24 is improved.

In addition, in the display device 1C, the thickness of the first planarization film 213 is set to be smaller than the thickness of the second planarization film 225 similar to the display device 1. Thus, the area of the inner wall surface of the third opening section 213*a* is smaller than the area of the inner wall surface of the first opening section 225*a*, and the formation area of the third inorganic insulation film 215 may be reduced.

On the other hand, since the width of the third opening section 213*a* is larger than the width of the first opening section 225*a*, the area in which the third inorganic insulation film 213*a* is located can be increased in the first planarization film 213. Accordingly, the adhesion area between the seal material 24 and the third inorganic insulation film 215 can be secured, and the adhesion strength between the first substrate 21 and the seal material 24 is improved. Therefore, the seal material 24 is difficult to be separated from the first substrate 21.

In addition, the number of the formations of the third opening section 213a may be greater than the number of the formations of the first opening section 225a instead of or in addition to the width of the third opening section 213a being greater compared to the width of the first opening section 225a. Accordingly, the seal material 24 is difficult to be separated from the first substrate 21.

Fifth Embodiment

Figure 12:
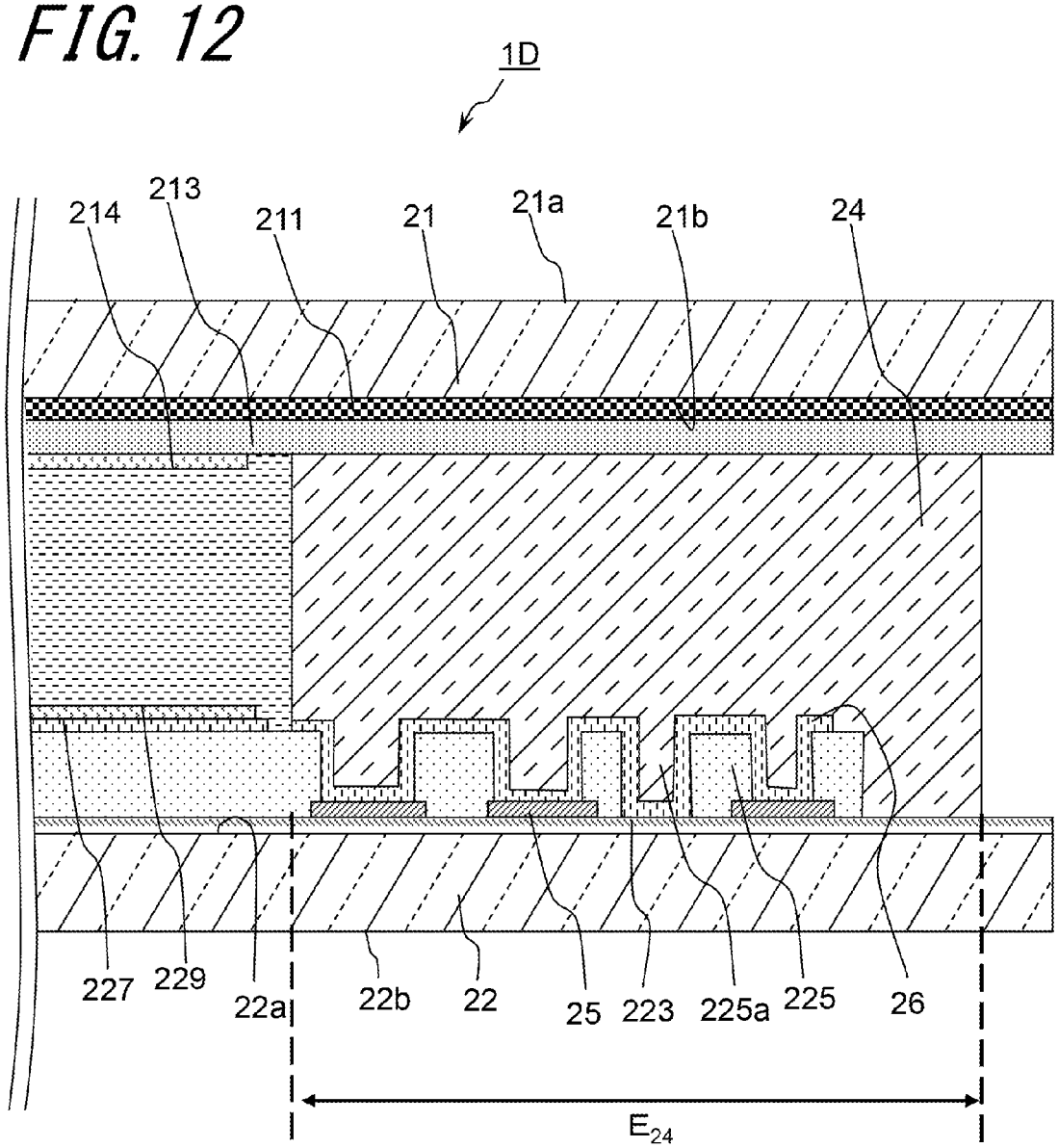
FIG. 12 is a cross-sectional view illustrating a main portion of a liquid crystal panel according to a fifth embodiment of the invention.

FIG. 12 is a view illustrating a main portion of a display device 1D according to a fifth embodiment.

The display device 1D is different from the display device 1 in that the first opening section 225a of the second planarization film 225 is not only located in the area in which the wiring conductor 25 is located but also located in the wiring conductor non-forming area in which the wiring conductor 25 is not located.

In addition, as illustrated in FIG. 12, the first inorganic insulation film 26 is located to continue from the inside of the first opening section 225a positioned in the wiring conductor non-forming area to the surface of the second planarization film 225 through the inner wall surface of the first opening section 225a, and the first inorganic insulation film 26 is directly covered with the seal material 24.

In the display device 1D, the first opening section 225a of the second planarization film 225 is located in the wiring conductor non-forming area, the first inorganic insulation film 26 is located to continue from the inside of the first opening section 225a to the surface of the second planarization film 225 through the inner wall surface of the first opening section 225a, and the first inorganic insulation film 26 is directly covered with the seal material 24. Accordingly, effects similar to the effects described in the display device 1 are achieved.

The invention is not specifically limited to the first to the fifth embodiments and it is possible to be changed variously and improved in the scope of the invention.

In addition, in the above first to the fifth embodiments, the first opening section 225a is located by passing through the second planarization film 225; however, may be located as a concave portion which does not pass through the second planarization film 225.

REFERENCE SIGNS LIST 1, 1A, 1B, 1C, 1D: Display device
2: Liquid crystal panel
$E_1$: Inner area
P: Pixel
$E_0$: Outer area
$E_{24}$: Seal formation area
$E_{24a}$: Peripheral portion
$E_{24b}$: Corner portion
21: First substrate
21a: First main surface (Outer main surface)
21b: Second main surface (Inner main surface)
211: Light blocking film
212: Color filter
213: First planarization film (Second organic insulation film)
213a: Third opening section
214: First orientation film
215: Third inorganic insulation film
22: Second substrate
22a: First main surface (Inner main surface)
22b: Second main surface (Outer main surface)
221: Gate wiring
222: Gate insulation film
223: First interlayer insulation film (Second inorganic insulation film)
224: Source wiring
225: Second planarization film (Organic insulation film)
225a: First opening section (Opening section)
225b: Second opening section
226: Common electrode (First display electrode)
227: Second interlayer insulation film
228: Signal electrode (Second display electrode)
229: Second orientation film
23: Liquid crystal layer
24: Seal material
25: Wiring conductor
26: First inorganic insulation film (Inorganic insulation film)
3: Light source unit
31: Light source
32: Light guide plate
4: First polarization plate
5: Second polarization plate

What is claimed is:

1. A display device, comprising:
a first substrate and a second substrate each of which has an inner main surface of the first substrate and an inner main surface of the second substrate facing each other;
a liquid crystal layer located between the first substrate and the second substrate;
a seal material located between the first substrate and the second substrate, the seal material surrounding the liquid crystal layer, the seal material bonding the first substrate and the second substrate;
a first organic insulation film located in a seal formation area in which the seal material on the inner main surface of the second substrate is positioned, the first organic insulation film having an opening section in the seal formation area;
a first inorganic insulation film directly covered with the seal material:
a second inorganic insulation film located on the inner main surface of the second substrate; and
a wiring conductor which is located and overlaps the seal formation area on the second insulation film,
wherein the opening section of the first organic insulation film is positioned on the wiring conductor and reaches the wiring conductor, and the first inorganic insulation film is located to continue from an upper side of the wiring conductor in the opening section to a surface of the first organic insulation firm through an inner wall surface of the opening section.

2. The display device according to claim 1,
wherein the first organic insulation film has a plurality of opening sections, and
the first inorganic insulation film is located to continue between opening sections adjacent to each other.

3. The display device according to claim 1,
wherein the seal formation area has a corner portion, and
the opening section is positioned in the corner portion of the seal formation area.

4. The display device according to claim 1,
wherein the first organic insulation film is located to continue from an inner area surrounded by the seal material to the seal formation area, the display device further comprising:

a first display electrode located on the first organic insulation film in the inner area, an interlayer insulation film located on the first organic insulation film, covering the first display electrode, the interlayer insulation film having a same main component as the first inorganic insulation film, and a second display electrode located on the interlayer insulation film, the second display electrode generating an electric field between the first display electrode and the second display electrode.

5. The display device according to claim 1, wherein the organic insulation film located in the seal formation area has a second opening section in the wiring conductor non-forming area in which the wiring conductor does not exist, and the second inorganic insulation film is located on a bottom of the second opening section, and an upper surface of the second inorganic insulation film is in contact with the seal material.

6. The display device according to claim 1, further comprising:

a second organic insulation film located in the seal formation area in which the seal material is located on the inner main surface of the first substrate, the second organic insulation film having a third opening section in the seal formation area, and a third inorganic insulation film located to continue from the inside of the third opening section to the surface of the second inorganic insulation film through the inner wall surface of the third opening section, the third inorganic insulation film being directly covered with the seal material.

* * * * *